US012762372B2

(12) United States Patent
Tanji

(10) Patent No.: US 12,762,372 B2
(45) Date of Patent: Oct. 13, 2026

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Koichi Tanji, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 656 days.

(21) Appl. No.: 18/194,322

(22) Filed: Mar. 31, 2023

(65) Prior Publication Data

US 2023/0325629 A1 Oct. 12, 2023

(30) Foreign Application Priority Data

Apr. 12, 2022 (JP) ................................. 2022-065813

(51) Int. Cl.
*G06N 3/04* (2023.01)

(52) U.S. Cl.
CPC ...................................... *G06N 3/04* (2013.01)

(58) Field of Classification Search
None
See application file for complete search history.

(56) References Cited

U.S. PATENT DOCUMENTS

2020/0234132 A1* 7/2020 Tan ........................ G06N 3/063
2021/0266535 A1* 8/2021 Kawai .................. H04N 19/159
2022/0092398 A1* 3/2022 Jennings ................ G06N 3/063
2022/0269279 A1* 8/2022 Redford .................... G05D 1/81
2023/0325629 A1* 10/2023 Tanji ........................ G06N 3/08
706/27
2023/0334315 A1* 10/2023 Tanji ...................... G06N 3/045
2025/0086473 A1* 3/2025 Tong ...................... G06N 20/00

FOREIGN PATENT DOCUMENTS

JP 2017182710 A 10/2017
WO 2020026741 A1 2/2020

OTHER PUBLICATIONS

Liu, H., et al., "DARTS: Differentiable Architecture Search", ICLR 2019.
Zoph, B., et al., "Neural Architecture Search with Reinforcement Learning", ICLR 2017.
Xie, S., et al., "SNAS: Stochastic Neural Architecture Search", ICLR 2019.
Real, E., et al., "Large-Scale Evolution of Image Classifiers", PMLR, 2017.
Ren, P., et al., "A Comprehensive Survey of Neural Architecture Search: Challenges and Solutions", ACM Comput. Surv., Aug. 2020, vol. 37, No. 4.

* cited by examiner

*Primary Examiner* — Daniel T Tekle
(74) *Attorney, Agent, or Firm* — Canon U.S.A., Inc. IP Division

(57) ABSTRACT

An information processing apparatus configured to optimize an architecture of a network model includes at least one memory storing instructions, and at least one processor that, upon execution of the instructions, is configured to perform a search for the architecture based on data for learning, evaluate a topology of the network model that corresponds to the architecture obtained in a process of the search, and perform control to output a change in an evaluation result of the topology as the search progresses.

12 Claims, 13 Drawing Sheets

INFORMATION PROCESSING APPARATUS, INFORMATION PROCESSING METHOD, AND STORAGE MEDIUM

BACKGROUND

Field

The present disclosure relates to a machine learning technique.

Description of the Related Art

In recent years, a technique called Neural Architecture Search (NAS) has been attracting attention in the field of machine learning (refer to "A Comprehensive Survey of Neural Architecture Search: Challenges and Solutions", P. REN et al. (ACM Comput. Surv., Vol. 37, No. 4, Article 111)). NAS is a technique of searching for and determining an architecture (including the type of calculation to be performed in each layer, and connection states between layers) in a hierarchical network in order to obtain higher performance. In NAS, an optimum architecture is searched for, and simultaneously a weight coefficient and other parameters corresponding to the architecture found in the search is learned.

Architecture search methods using NAS include the followings. A method using an evolutionary algorithm (EA) is discussed in "Large-scale evolution of image classifiers", E. Real et al. (ICML 2017). In the EA method, an evolutionary algorithm is used to search for an optimum architecture. More specifically, a group of candidate architectures is prepared, and an evolutionary algorithm such as mutation and selection is applied to this group, whereby a higher-performance architecture is eventually determined.

A method using reinforcement learning (RL) is discussed in "Neural Architecture Search with Reinforcement Learning", B. Zoph et al. (ICLR 2017). In the RL method, an architecture is generated using a controller recurrent neural network (RNN). Subsequently, using accuracy (a correct answer rate) in the generated architecture as a reward, the controller RNN is updated by a policy gradient method to perform learning.

A method using gradient descent (GD) is discussed in each of "DARTS: Differentiable Architecture Search", H. Liu et al. (ICLR 2019), and "SNAS: Stochastic Neural Architecture Search", S. Xie et al. (ICLR 2019). In the GD method, a space to be searched for an architecture is expressed by a directed acyclic graph (DAG), a maximum graph expression is used as a parent graph, and an optimum architecture is searched for in the range of a child graph to be a subset thereof.

In the GD method, discrete selection of calculations to be executed in respective layers of an architecture is not performed unlike the RL method described above, and a continuous expression in which calculations are mixed is used. Thus, calculations (e.g., a convolution calculation, a pooling calculation, and a zero calculation) that can be selected in each layer are added together and expressed using a softmax function (refer to "DARTS: Differentiable Architecture Search", H. Liu et al. (ICLR 2019)) or concrete distribution (refer to "SNAS: Stochastic Neural Architecture Search", S. Xie et al. (ICLR 2019)). Subsequently, the architecture expression and the weight coefficient are optimized. As a loss function for optimizing the architecture expression, a validation loss (refer to "DARTS: Differentiable Architecture Search", H. Liu et al. (ICLR 2019)) or a generic loss (refer to "SNAS: Stochastic Neural Architecture Search", S. Xie et al. (ICLR 2019)) is used.

In the conventional NAS methods described above, the performance of a network model in an architecture search process is evaluated by monitoring a temporal change in accuracy (correct answer rate). However, even if the temporal change in accuracy (correct answer rate) is monitored, a change in network connection state cannot be grasped. In addition, even if a temporal change in network connection state is monitored, a change in connection state of the entire network model cannot be grasped. Thus, the performance of the network model in the architecture search process cannot be precisely evaluated, which makes it difficult to search for an architecture efficiently.

SUMMARY

The present disclosure is directed to improving performance evaluation in a process of searching for an architecture of a network model.

According to an aspect of the present disclosure, an information processing apparatus configured to optimize an architecture of a network model includes at least one memory storing instructions, and at least one processor that, upon execution of the instructions, is configured to perform a search for the architecture based on data for learning, evaluate a topology of the network model that corresponds to the architecture obtained in a process of the search, and perform control to output a change in an evaluation result of the topology as the search progresses.

Further features of the present disclosure will become apparent from the following description of exemplary embodiments with reference to the attached drawings.

DESCRIPTION OF THE EMBODIMENTS

Exemplary embodiments of the present disclosure will be described below with reference to the attached drawings. Configurations described in the following exemplary embodiments are merely examples, and the present disclosure is not limited to the illustrated configurations.

In a first exemplary embodiment, a network model is optimized using a technique of Neural Architecture Search (NAS).

The network model is assumed to be a hierarchical network such as a neural network. In NAS, an architecture (including the type of calculation to be performed in each layer, and connection states between layers) of a hierarchical network is searched for and determined in order to obtain higher performance. The following description will be given assuming a case where a unit structure called CELL (a micro-architecture) of an architecture (a macro-architecture) of the entire network is searched for.

Figure 1:
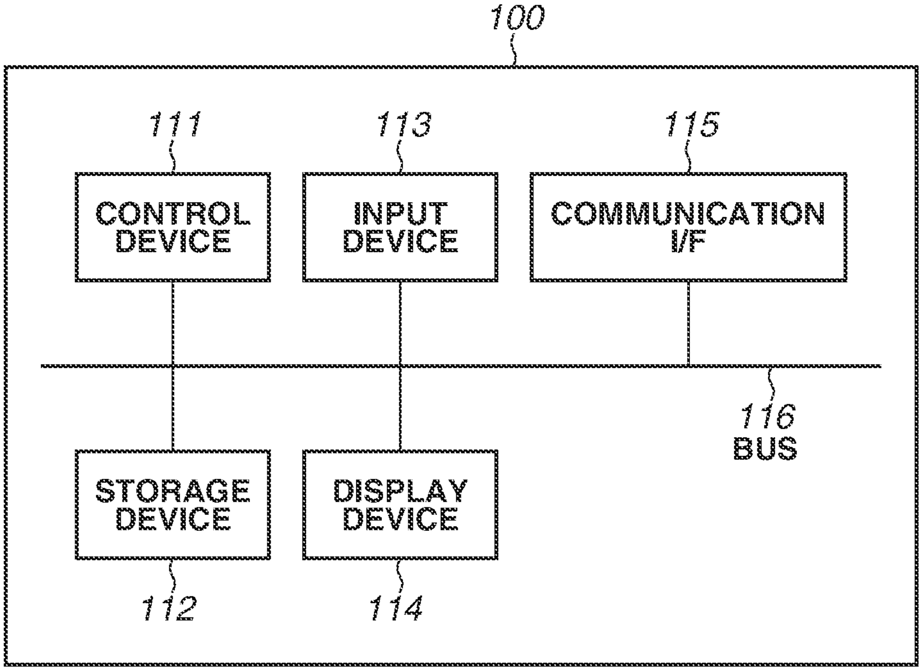
FIG. 1 is a block diagram illustrating an example of a hardware configuration of an information processing apparatus according to a first exemplary embodiment.

FIG. 1 illustrates an example of a hardware configuration of an information processing apparatus 100 according to the present exemplary embodiment. The information processing apparatus 100 according to the present exemplary embodiment includes a control device 111, a storage device 112, an input device 113, a display device 114, and a communication interface (I/F) 115. These components are interconnected via a bus 116. The control device 111 includes a central processing unit (CPU) and a graphics processing unit (GPU), and controls the entire information processing apparatus 100. The control device 111 functions as a calculator that performs NAS. The storage device 112 includes a hard disk, and stores a program for operation of the control device 111, data to be used for various types of processing, data obtained as results of performing various types of processing, and the like.

The input device 113 is a human interface device or the like, and inputs user operation information, which indicates an operation performed by a user, to the information processing apparatus 100. The display device 114 is a display or the like, and displays a result of performing processing according to the present exemplary embodiment under control of the control device 111. The communication I/F 115 performs a communication connection with an external apparatus by wire or wirelessly, and exchanges data with the external apparatus under the control of the control device 111.

While FIG. 1 illustrates the configuration where the storage device 112, the input device 113, and the display device 114 are arranged in a housing of the information processing apparatus 100, the present exemplary embodiment is not limited thereto. The input device 113 and the display device 114 can be implemented by an external apparatus connected to the information processing apparatus 100 via the communication I/F 115 or an input/output I/F (not illustrated). Similarly, the storage device 112 can be implemented by an external data storage device connected to the information processing apparatus 100 via the communication I/F 115 or an input/output I/F (not illustrated).

Figure 2:
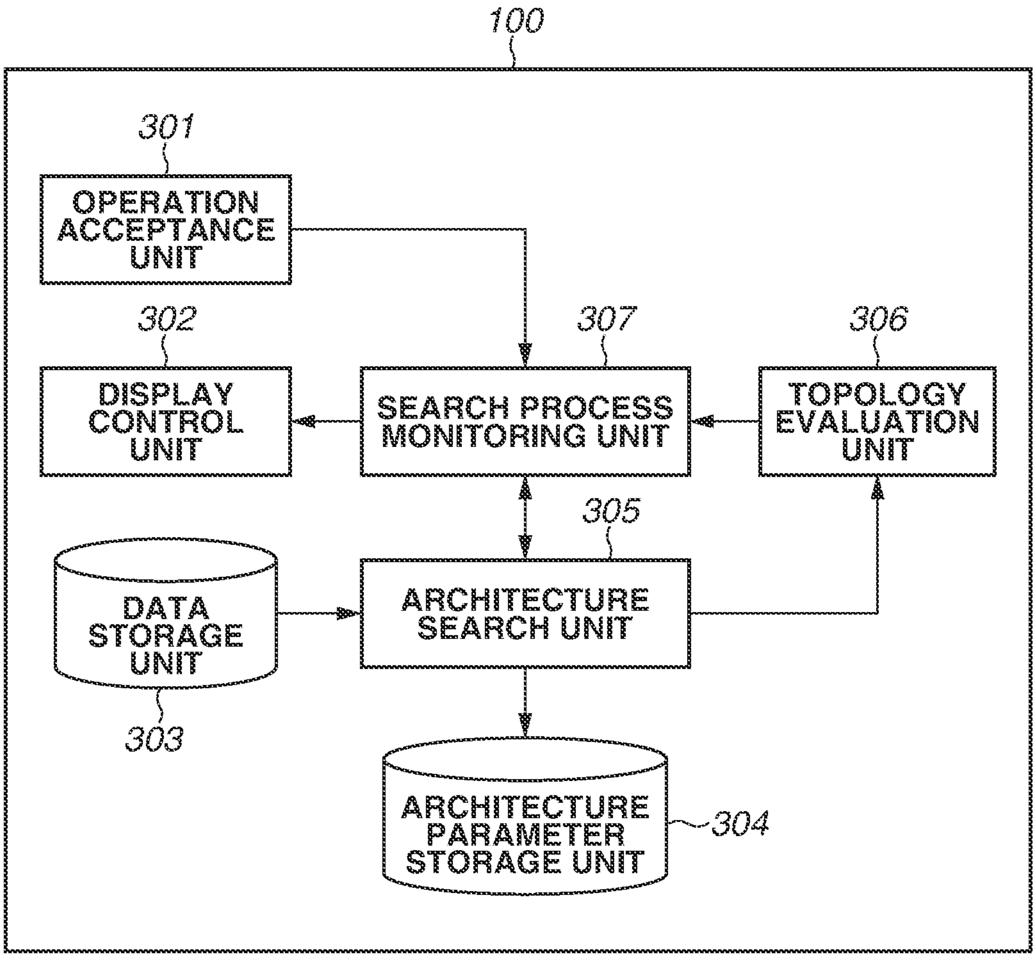
FIG. 2 is a block diagram illustrating an example of a functional configuration of the information processing apparatus according to the first exemplary embodiment.

FIG. 2 illustrates an example of a functional configuration of the information processing apparatus 100 according to the present exemplary embodiment. The information processing apparatus 100 includes an operation acceptance unit 301, a display control unit 302, an architecture search unit 305, a topology evaluation unit 306, and a search process monitoring unit 307. The control device 111 executes a program stored in the storage device 112, whereby the information processing apparatus 100 functions as each of these functional units. The storage device 112 of the information processing apparatus 100 stores a data storage unit 303 storing training data and evaluation data, and an architecture parameter storage unit 304 storing information about an architecture determined in a search.

The operation acceptance unit 301 accepts the user operation information via the input device 113. The architecture search unit 305 performs various types of processing, such as continuation and stoppage of an architecture search, based on the user operation information accepted by the operation acceptance unit 301. The user performs various operations while viewing a result of monitoring by the search process monitoring unit 307, which is displayed on the display device 114.

The display control unit 302 performs processing for controlling a screen to be displayed on the display device 114. More specifically, the display control unit 302 controls the display device 114 to display a result of monitoring by the search process monitoring unit 307 or a graphical user interface (GUI) to be used for operations by the user.

The data storage unit 303 stores training data and evaluation data.

The architecture parameter storage unit 304 stores information about an architecture obtained as a result of a search by the architecture search unit 305.

The architecture search unit 305 performs a NAS-based search using the training data (the data for learning) held in the data storage unit 303, and stores in the architecture parameter storage unit 304 information about an architecture finally obtained as a result of the search. Using the evaluation data held in the data storage unit 303, the architecture search unit 305 also calculates validation accuracy (a correct answer rate on the evaluation data, hereinafter referred to as "val_acc") of a network obtained in the search process.

The topology evaluation unit 306 acquires from the architecture search unit 305 information about the network obtained in the search process, and evaluates a network topology based on the acquired information.

The search process monitoring unit 307 acquires from the architecture search unit 305 information about the correct answer rate of the network. The search process monitoring unit 307 also acquires from the topology evaluation unit 306 information about the evaluation of the network topology. The search process monitoring unit 307 monitors a temporal change in these evaluation results, and outputs a result of the monitoring to the display control unit 302.

Figure 3:
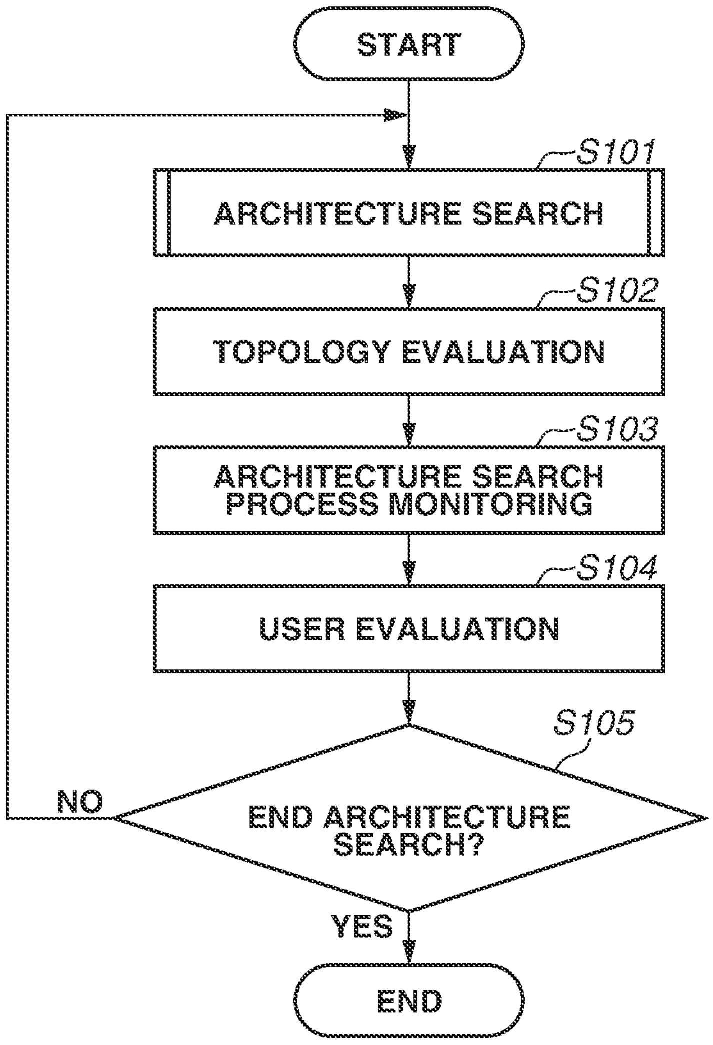
FIG. 3 is a flowchart illustrating overall processing for an architecture search according to the first exemplary embodiment.

Next, overall processing for an architecture search by the information processing apparatus 100 according to the present exemplary embodiment will be described. FIG. 3 is a flowchart illustrating the overall processing for the architecture search according to the present exemplary embodiment. Processing of each step in the flowchart is implemented by the control device 111 executing a program stored in the storage device 11 or the like.

In the present exemplary embodiment, steps S101 to S104 in FIG. 3 are repeated, so that the architecture search process progresses. The following description will be given assuming a case where the transition of the val_acc and a topological invariant in the architecture search process is monitored. The indices to be monitored are not limited thereto. The topological invariant is an example of a network topology evaluation value.

In step S101, the architecture search unit 305 performs a search for an architecture using NAS. More specifically, the architecture search unit 305 reads appropriate data for learning from the data storage unit 303, and uses the read data to search for an architecture and perform learning of a weight coefficient held by the network corresponding to the architecture found in the search. The architecture search is performed by learning of architecture-related parameters.

In this step, the learning is performed using the data for learning, including input data and training data. The input data is input to a target network, and an error of an output value obtained as a result of a feedforward calculation is back-propagated in the network, so that the architecture-related parameters and the weight coefficient of the network are updated. The training data is used to calculate the error of the output value described above. The training data represents desired output (a label value or distribution thereof) corresponding to the input data.

Figure 4:
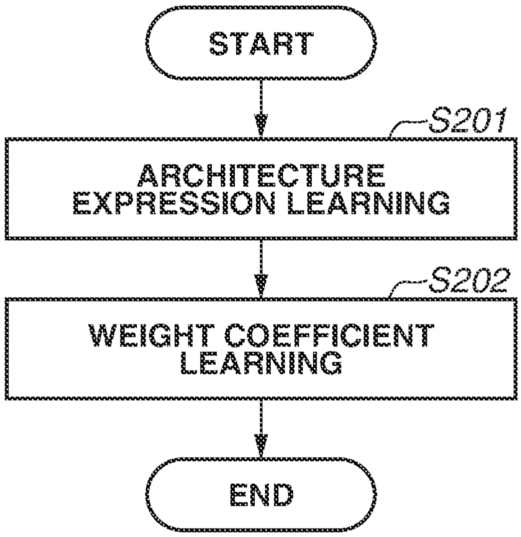
FIG. 4 is a flowchart illustrating the architecture search.

FIG. 4 is a detailed flowchart of the processing performed in step S101.

In step S201, the architecture search unit 305 performs a search for an optimum architecture expression. The architecture expression is such that, in a case where a search target network is expressed by connection states between a plurality of contact points (hereinafter referred to as "nodes") and calculations between the nodes, all calculations possible on the nodes are added together along with being weighted. The nodes are an example of elements of the network. The following description will be given of a case, as an example, where a search for a CELL structure including four nodes is performed assuming four calculations O ($o^1$, $o^2$, $o^3$, and 0: zero calculation) and using a gradient descent (GD) method (refer to "DARTS: Differentiable Architecture Search", H. Liu et al. (ICLR 2019) and "SNAS: Stochastic Neural Architecture Search", S. Xie et al. (ICLR 2019)). The zero calculation influences the connection states between the nodes, and expresses a state where two nodes are disconnected in a case where the value is 1.

Figure 5A:
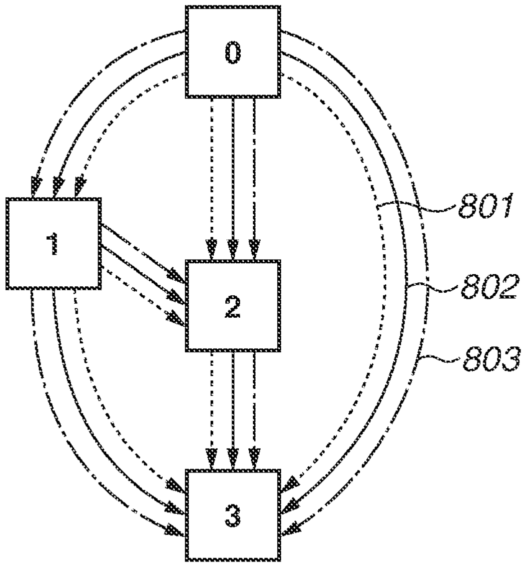
FIGS. 5A and 5B are schematic diagrams illustrating an architecture of a network.

FIG. 5A illustrates a CELL structure according to the present exemplary embodiment. The example of FIG. 5A indicates a network graph assuming four nodes denoted by node numbers 0 to 3 and four calculations O. Edges connecting the nodes represent the connection relationships between the nodes. A dotted line 801 represents the calculation $o^1$, a solid line 802 represents the calculation $o^2$, and a dashed-dotted line 803 represents the calculation $o^3$. Information $x^{(j)}$ held at a node j is expressed by the following formula (1), using output $x^{(i)}$ from a preceding node i and a calculation $o^{(i,j)}$ between the nodes i and j. The information held at each node is, for example, feature map information in the case of a convolutional neural network (CNN).

$$x^{(j)} = \sum_{i<j} o^{(i,j)}\left(x^{(i)}\right) \tag{1}$$

where i and j each represent a node number.

The calculation $o^{(i,j)}$ between the nodes i and j in the formula (1) can be expressed in a continuous manner in which calculations indicated by the following formula (2) are mixed, by adding the calculation $o^1$, the calculation $o^2$, and the calculation $o^3$ together using, for example, a softmax function, instead of being expressed in a discrete manner for each calculation.

$$\overline{o}^{(i,j)}(x) = \sum_{o \in O} \frac{\exp\left(\alpha_o^{(i,j)}\right)}{\sum_{o' \in O} \exp\left(\alpha_{o'}^{(i,j)}\right)} o(x) \tag{2}$$

In the formula (2), $\alpha^{(i,j)}$ is a vector expressing weighting for each calculation, and $$\alpha_o^{(i,j)}$$

is a component thereof. The calculation $o^{(i,j)}$ between the nodes i and j is expressed by a set $\alpha^{(i,j)}$ as indicated by the following formula (3).

$$\overline{\alpha} = \left\{\alpha^{(i,j)}\right\} \tag{3}$$

Figure 5B:
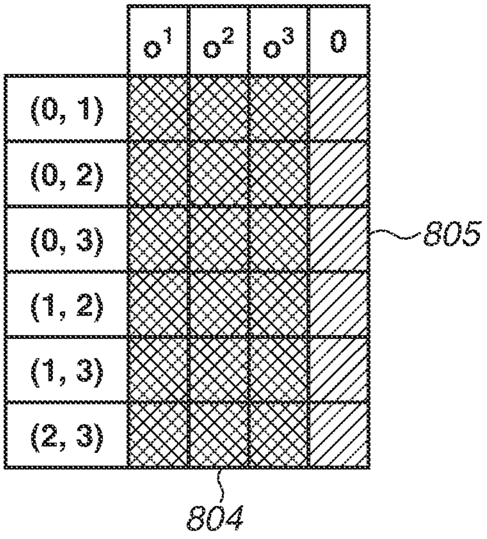

FIG. 5B is a schematic diagram in which the CELL structure illustrated in FIG. 5A is expressed by a matrix including the set α(i,j) expressed by the formula (3) and the zero calculation. The expression as in FIG. 5B will be hereinafter referred to as the architecture expression matrix. A shaded area 804 in a lattice pattern represents weighting of the calculations ($o^1$, $o^2$, $o^3$) at inter-node connections {(0,1)(0,2)(0,3)(1,2)(1,3)(2,3)}, and a shaded area 805 filled with oblique lines represents values of the zero calculation corresponding to the states of the inter-node connections. The zero calculation expresses a state where two nodes are connected and a state where two nodes are disconnected, using 0 and 1 values.

As described above, the continuous expression is adopted, whereby a space searched with respect to the calculations can be made continuous, and a gradient method can be applied at the time of a search. For simple description, an architecture-related parameter set represented by the architecture expression matrix is expressed by α. A weighting parameter set held by the network is expressed by w. A loss value (a training loss) calculated using the training data is expressed by $L_{train}$. A loss value (a validation loss) calculated using the evaluation data is expressed by $L_{val}$. The loss values $L_{train}$ and $L_{val}$ are determined by the parameter sets α and w. In the architecture search, a pair of the parameter sets α and w minimizing the loss values $L_{train}$ and $L_{val}$ is searched for, as expressed by the following formula (4).

$$\min_{\alpha} L_{val}(w^*(\alpha), \alpha) \text{ s.t } w^*(\alpha) = \text{argmin}_w L_{train}(w, \alpha) \tag{4}$$

The description will continue referring back to FIG. 4.

In step S201, the architecture search unit 305 performs learning using the appropriate data for learning read from the data storage unit 303, for the network formed by the architecture expression matrix obtained in the last search (step S101). More specifically, using the following formula (5), a gradient for the loss value $L_{val}$ is calculated, and the architecture-related parameter set α is updated.

$$\nabla_{\alpha} L_{val}(w^*(\alpha), \alpha) \tag{5}$$

In step S202, the architecture search unit 305 performs learning using the appropriate data for learning read from the data storage unit 303, for the network having the architecture found in the search in step S101. More specifically, using the architecture-related parameter set a updated in step S201 and the following formula (6), a gradient for the loss value $L_{train}$ is calculated, and the weighting parameter set w of the network is updated.

$$\nabla_W L_{train}(w, \alpha) \quad (6)$$

As described above, in step S101, the architecture search unit 305 performs learning of the architecture-related parameters and learning of the weight coefficient held by the network. Repeating steps S101 to S104 updates the architecture expression matrix. Also in step S101, the architecture search unit 305 outputs the val_acc of the network calculated using the evaluation data, to the search process monitoring unit 307. The processing then proceeds to step S102.

The description will continue referring back to FIG. 3.

In step S102, the topology evaluation unit 306 acquires information about the connection state of the network from the architecture search unit 305, and evaluates the network topology.

Figure 6:
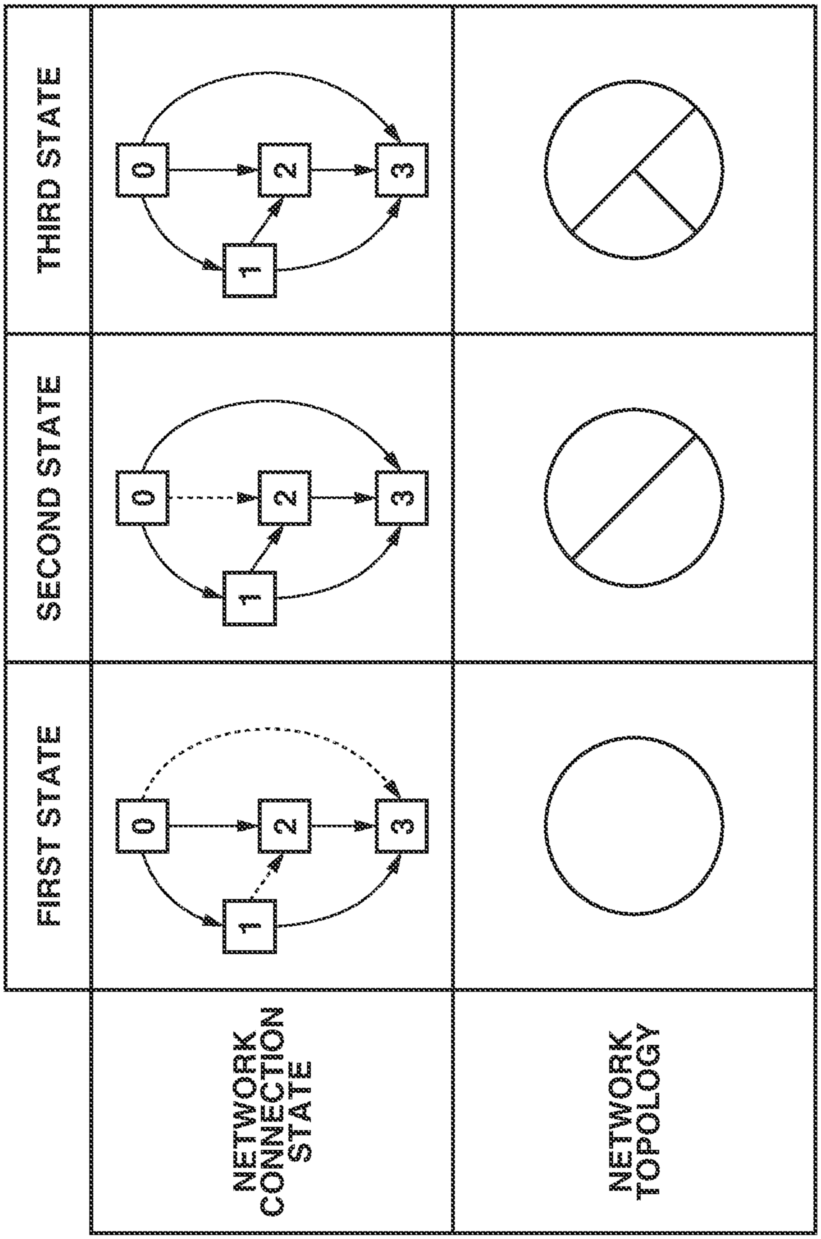
FIG. 6 is a schematic diagram illustrating a network topology.

FIG. 6 illustrates a specific example of the network topology in a case where four nodes (nodes 0 to 3) are assumed to be elements of the network as illustrated in FIG. 5A. FIG. 6 illustrates each of a case where the network topology is in a first state where the nodes 1 and 2 are disconnected and the nodes 0 and 3 are disconnected, a case where the network topology is in a second state where the nodes 0 and 2 are disconnected, and a case where the network topology is in a third state where no nodes are disconnected. The network topology is expressed in a form of remaining invariant even if the original shape of the network continuously transforms. The amount of remaining invariant is referred to as the topological invariant. As illustrated in FIG. 6, the network topology can conceptually express a change in network structure that occurs depending on the connection state of the network.

Figure 7:
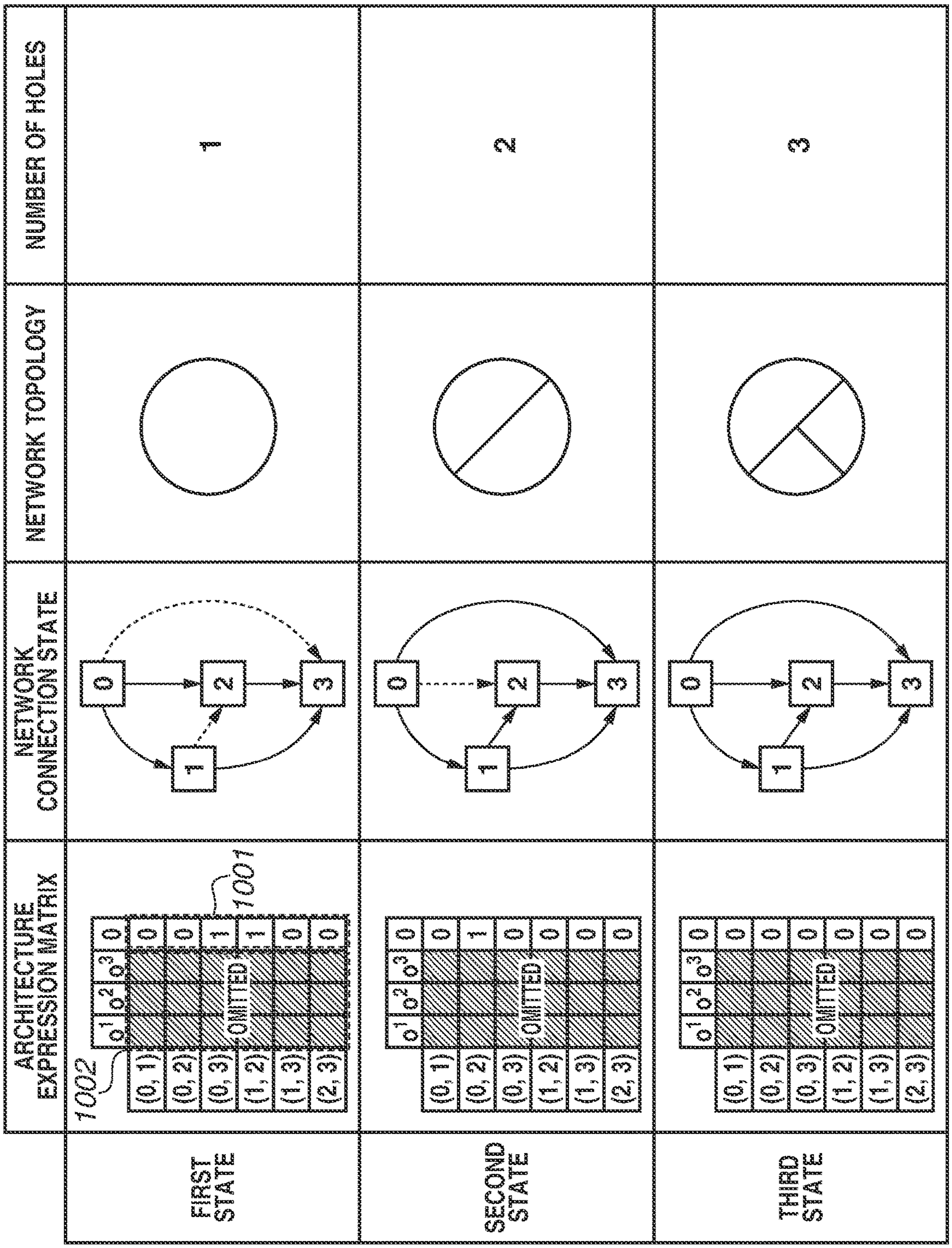
FIG. 7 is a diagram illustrating examples of a correspondence relationship between the network topology and a topological invariant.

FIG. 7 schematically illustrates examples of a correspondence relationship between the architecture expression matrix, the connection state of the network, the network topology, and the topological invariant. An upper part of FIG. 7 illustrates the correspondence relationship in the first state in FIG. 6. A middle part of FIG. 7 illustrates the correspondence relationship in the second state in FIG. 6. A lower part of FIG. 7 illustrates the correspondence relationship in the third state in FIG. 6. In the present exemplary embodiment, the number of holes is used as the topological invariant. In the first state, the number of holes is 1. In the second state, the number of holes is 2. In the third state, the number of holes is 3. The state of a macro form of the network can be quantitatively evaluated by using the number of holes.

A frame 1001 in the architecture expression matrix illustrated in the upper part of FIG. 7 indicates a part where the values of the zero calculation between the nodes are described, in the architecture expression matrix in the first state.

In the present exemplary embodiment, to indicate each of the connection states in a simple manner, the value of the zero calculation having a 0 or 1 value is expressed by 0 or 1, but actually, a certain threshold (e.g., 0.8) is set, and a value more than or equal to the threshold is determined as 1 (a disconnected state). This also applies to the other architecture expression matrices illustrated in FIG. 7. A frame 1002 in the architecture expression matrix in the upper part of FIG. 7 indicates a part describing the calculations between the nodes, in the architecture expression matrix in the first state. In this way, the architecture expression matrix is divided into the part about the connection states between the nodes and the part about the calculations between the nodes. In the present exemplary embodiment, the correspondence relationship between the part about the connection states between the nodes and the topological invariant is held in the storage device 112 as, for example, a look-up table (LUT). The topology evaluation unit 306 reads out the part about the connection states between the nodes from the architecture expression matrix obtained in step S101, and acquires the topological invariant as the network topology evaluation value using the held LUT. A technique such as persistent homology can be used to evaluate the topological invariant when the LUT is created.

In step S103, each time steps S101 to S104 in FIG. 3 are repeated, the search process monitoring unit 307 stores, in time series, the val_acc acquired in step S101 and the topological invariant acquired in step S102 into the storage device 112. In this way, the search process monitoring unit 307 monitors the temporal change in the val_acc and the topological invariant.

Figure 8:
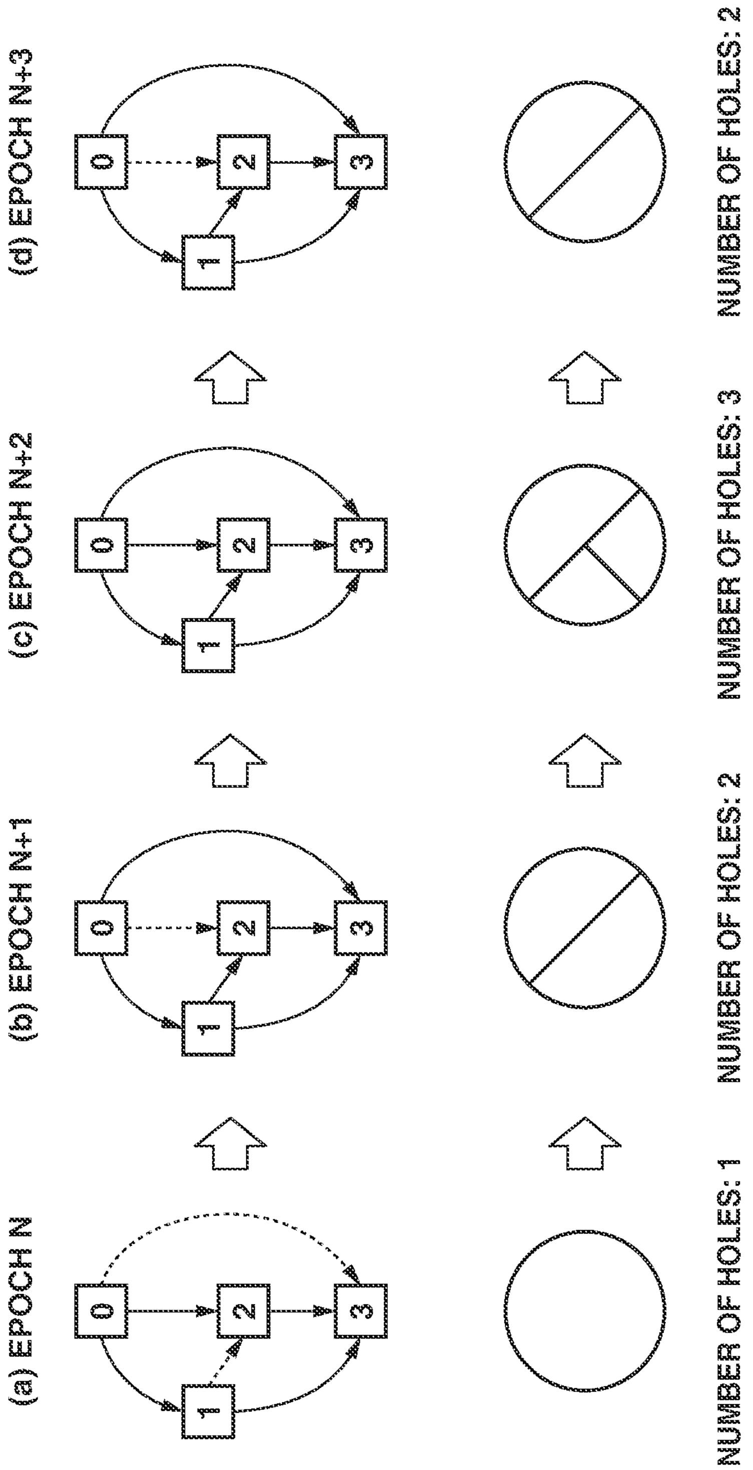
FIG. 8 is a diagram illustrating a temporal change of the network topology.

FIG. 8 schematically illustrates the change of the network topology in the architecture search process. In FIG. 8, a state (a) corresponds to the case of an epoch number N, a state (b) corresponds to the case of an epoch number N+1, a state (c) corresponds to the case of an epoch number N+2, and a state (d) corresponds to the case of an epoch number N+3. The epoch number is a number indicating how many times a data set for learning is learned. An upper part of FIG. 8 illustrates the connection state of the network in the case of the corresponding epoch number, and a lower part of FIG. 8 illustrates the network topology and the number of holes in the case of the corresponding epoch number. In the example of FIG. 8, the number of holes is 1 in the case of the epoch number N, the number of holes is 2 in the case of the epoch number N+1, the number of holes is 3 in the case of the epoch number N+2, and the number of holes is 2 in the case of the epoch number N+3. In this way, as the architecture search process progresses, the network topology changes, and the corresponding topological invariant also changes.

Figure 9:
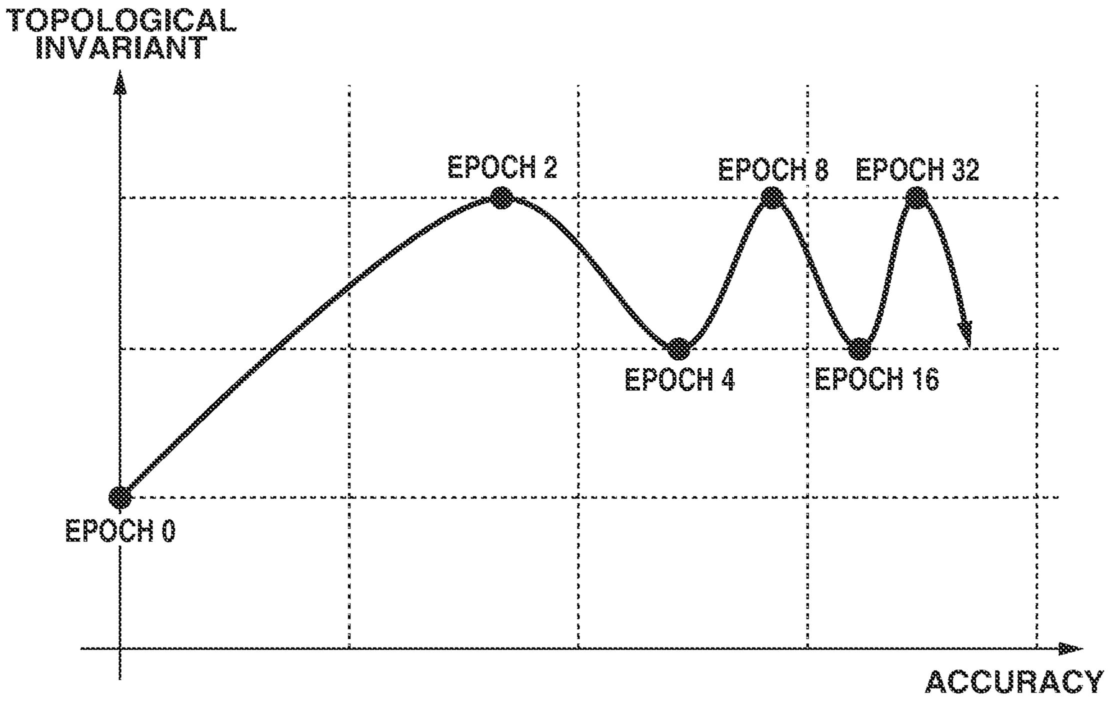
FIG. 9 is a diagram illustrating transition of accuracy (a correct answer rate) and the topological invariant.

FIG. 9 schematically illustrates an example of the result of monitoring by the search process monitoring unit 307. In FIG. 9, the horizontal axis represents the val_acc, the vertical axis represents the topological invariant (the number of holes) corresponding to the network topology, and the relationship between the val_acc and the topological invariant (the number of holes) is plotted on a graph. In the example of FIG. 9, the relationship between the val_acc and the topological invariant (the number of holes) is plotted as the architecture search process progresses in such a way that the epoch number changes in order of 0, 2, 4, 8, 16, and 32.

In step S104, the display control unit 302 controls the display device 114 to display the monitoring result stored in step S103. The monitoring result displayed on the display device 114 is updated to the latest state as the architecture search process progresses. The display content of the display device 114 is presented to the user. The user can perform various determinations, such as continuation and stoppage of the architecture search, while viewing the monitoring result. The architecture search unit 305 performs various types of processing, such as continuation and stoppage of the architecture search, based on the user operation information accepted by the operation acceptance unit 301. The output destination of the monitoring result is not limited to the display device 114. The control device 111 can control the storage device 112 to store the val_acc and the topological invariant, which are acquired in the search process, in association with the epoch number. The transition of the val_acc and the topological invariant in the search process can be thereby analyzed based on the data read out from the storage device 112.

Figure 10:
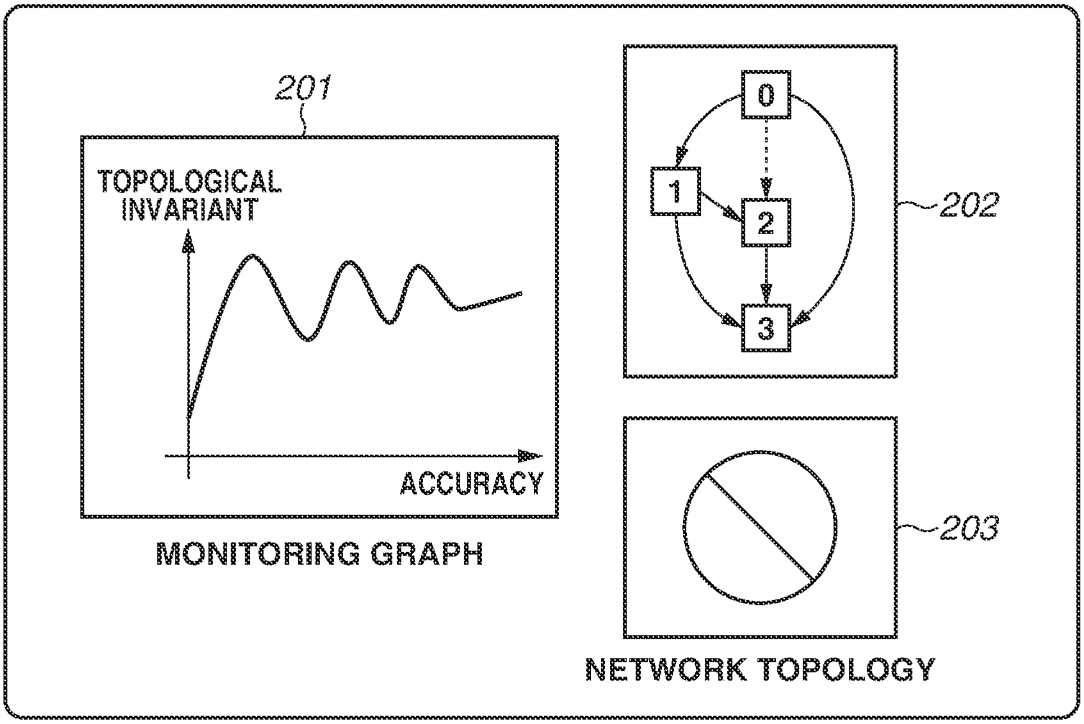
FIG. 10 is a diagram illustrating a display example of a monitoring screen.

FIG. 10 is a diagram illustrating an example of the monitoring screen displayed on the display device 114 in step S104. In an area 201, a graph representing the relationship between the val_acc and the topological invariant with the progress of the architecture search process is displayed. Any other form of graph can be used if the change in the val_acc and the change in the topological invariant that occur as the architecture search process progresses can be simultaneously confirmed from the graph. A graph indicating the transition of each of the val_acc and the topological invariant corresponding to the epoch number can also be used. A graph indicating only the transition of the topological invariant corresponding to the epoch number can also be used. In an area 202, the connection state of the network in the architecture search process is displayed. In an area 203, the network topology corresponding to the network connection state displayed on the area 202 is displayed. The image displayed in each of the areas 202 and 203 can be the image in the latest state, or the image in the state corresponding to the epoch number selected by the user.

In the architecture search process, the user can refer to the information displayed in step S104 to evaluate the performance of the network based on both the val_acc and the topological invariant. Thus, the accuracy of evaluating the performance of the network increases. In addition, in a case where the topological invariant settles near a fixed value, the search for the network topology can be considered to have settled, and the architecture search unit 305 can continue the learning of the weight coefficient after fixing the architecture-related parameters. This makes it possible to reduce the search space, thereby improving the efficiency of the search. In a case where the val_acc and the topological invariant each settle near a fixed value, the search can be regarded as having settled on a stable solution, and the architecture search unit 305 can stop the learning. Whether the topological invariant has settled near the fixed value can be determined by the search process monitoring unit 307 based on the amount of change in the topological invariant corresponding to a predetermined epoch number, or can be determined by the operation acceptance unit 301 based on an instruction from the user.

In step S105, the architecture search unit 305 determines whether to end the architecture search. In the present exemplary embodiment, the architecture search unit 305 determines whether an instruction to stop the architecture search is received from the operation acceptance unit 301. In this determination, a determination as to whether the epoch number has reached a predetermined number can also be made, and a determination as to whether at least a certain level of performance has been achieved or whether the loss values each have become a fixed value or less using the evaluation data can also be made. In a case where the architecture search unit 305 determines to end the architecture search (YES in step S105), information about the finally obtained architecture is stored into the architecture parameter storage unit 304, and the series of steps in the flowchart ends. In a case where the architecture search unit 305 determines to continue the architecture search (NO in step S105), the information processing apparatus 100 repeats steps S101 to S104.

As described above, in the present exemplary embodiment, the state of the macro form of the network model can be appropriately evaluated by the evaluation of the network topology in the NAS-based architecture search process.

While the above description has been given assuming the case where the CELL structure with respect to the entire network is searched for, the present exemplary embodiment is also applicable to a case where the structure of the architecture of the entire network is searched for. While the above description has been given using the number of holes as a specific example of the topological invariant, the number of connected components or the number of hollow areas can also be used as the topological invariant.

As a modification of the present exemplary embodiment, the search process monitoring unit 307 can instruct the architecture search unit 305 to perform the learning of the weight coefficient after fixing the architecture-related parameters, in a case where the search process monitoring unit 307 determines that the topological invariant has settled near a fixed value.

This makes it possible to reduce the search space at the timing when the network topology is determined to have settled in a specific state, thereby improving the efficiency of the search. In this case, the display control unit 302 may not necessarily display on the display device 114 the monitoring result stored in step S103.

In a second exemplary embodiment, a description will be given of a case where, during the architecture search according to the first exemplary embodiment, the network topology is intentionally changed by a user operation, and a response thereto is reflected in the monitoring result. Description of a part common to the first exemplary embodiment will be omitted, and a difference from the first exemplary embodiment will be mainly described.

Figure 11:
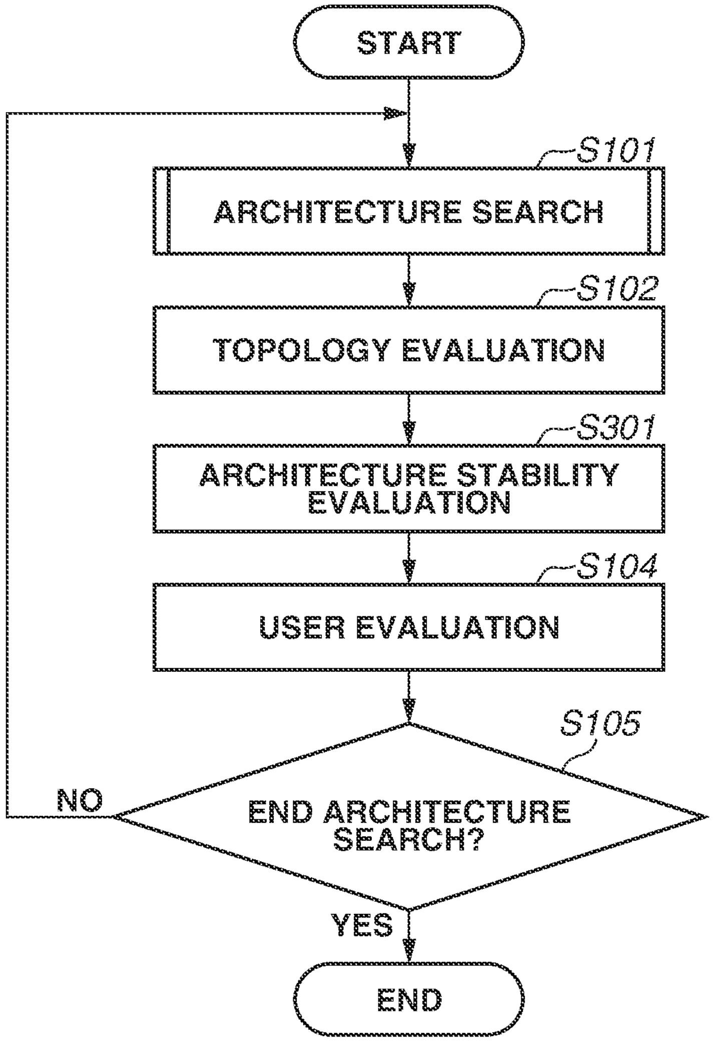
FIG. 11 is a flowchart illustrating overall processing for an architecture search according to a second exemplary embodiment.

Overall processing for an architecture search performed by an information processing apparatus according to the present exemplary embodiment will be described. FIG. 11 is a flowchart illustrating the overall processing for the architecture search according to the present exemplary embodiment. The flowchart in FIG. 11 is different from the flowchart in FIG. 3 in that processing of step S301 replaces the processing of step S103. The processing of step S301 will thus be described.

In step S301, the control device 111 changes the network topology at present, based on the user operation information accepted by the operation acceptance unit 301. More specifically, the user operates the GUI to change a value (0 or 1) in the part about the connection states between the nodes in the architecture expression matrix updated in step S101. The network topology is thereby changed. Alternatively, the user can operate the GUI to change the network topology, and the control device 111 can reflect the change in the architecture expression matrix. The search process monitoring unit 307 monitors the val_acc and the topological invariant acquired in the search before and after the network topology is changed. In other words, the monitoring result reflects a change in the val_acc and the topological invariant before and after the change of the network topology. The user can thereby verify the global stability of the search result at present while viewing the monitoring result.

Figure 12:
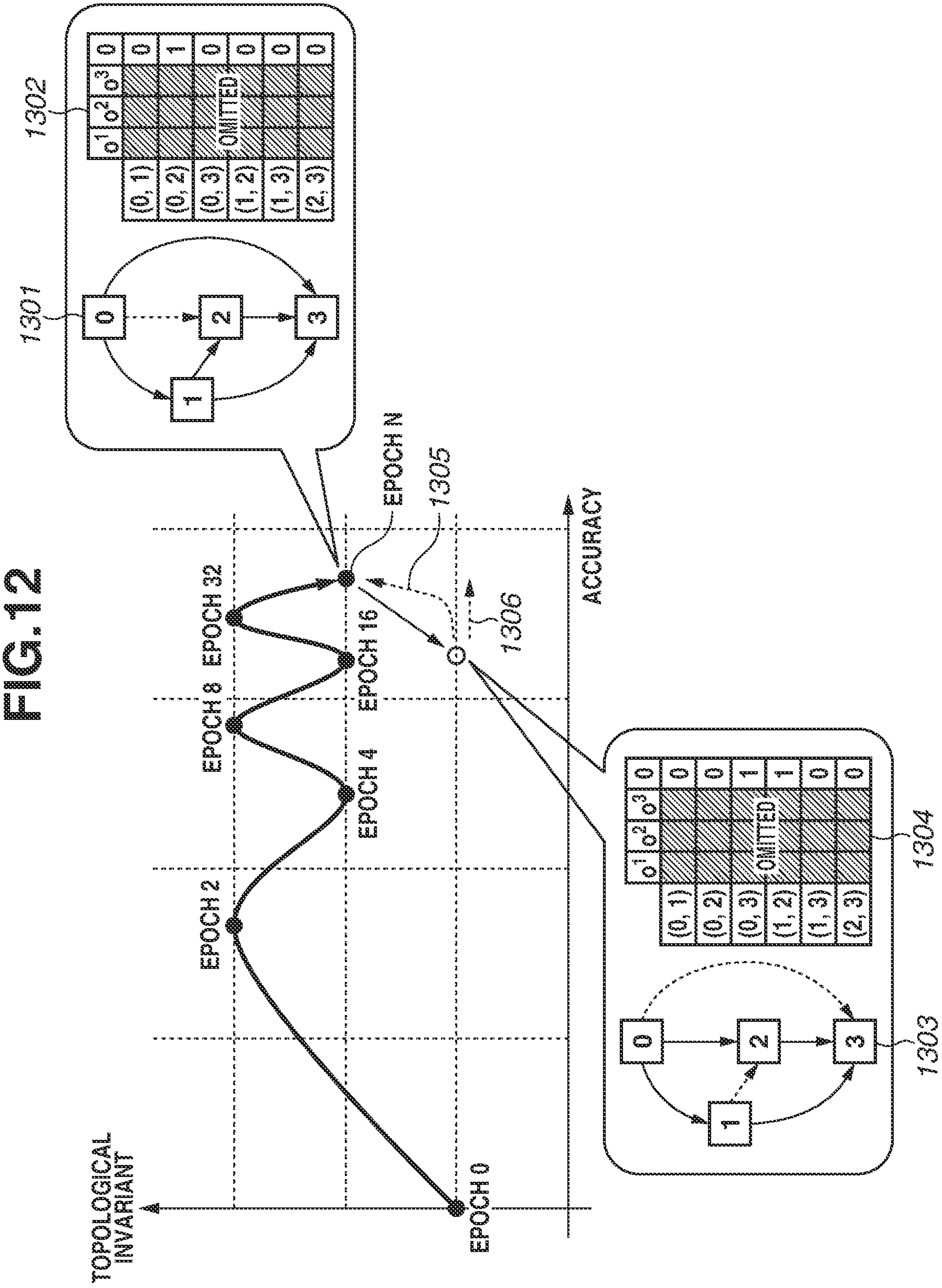
FIG. 12 is a diagram illustrating a method for verifying stability of a search result.

A method for verifying the global stability of the search result will be described with reference to FIG. 12. A graph representing the relationship between the val_acc and the topological invariant in FIG. 12 is similar to the graph in FIG. 9. A network graph 1301 represents the connection state of the network in the case of the epoch number N. An architecture expression matrix 1302 corresponds to the network graph 1301. Assume here that the user changes the network topology by operating the architecture expression matrix 1302 in the architecture search process. For example, assume that the nodes 0 and 3 become disconnected, the nodes 1 and 2 become disconnected, and the nodes 0 and 2 become connected. A network graph 1303 represents the connection state of the network after the change. An architecture expression matrix 1304 corresponds to the network graph 1303. The architecture expression matrices 1302 and 1304 each represent only the part about the connection states between the nodes, and the other parts are omitted.

A shift from the position of the epoch number N on the graph in FIG. 12 to the position of a white circle occurs due to the change of the connection state of the network. More specifically, the topological invariant changes from 2 to 1, and the val_acc decreases. The val_acc decreases because the weight coefficient of the network at the time when the epoch number is N is optimized for the architecture (the connection state of the network) at that time. In a case where the architecture search continues in this state, the val_acc and the network topology (the topological invariant corresponding thereto) are each supposed to be restored to the original state, as indicated by an arrow 1305, if the architecture at the time when the epoch number is N is globally stable. In other words, this architecture can be determined to be stable. In a case where the architecture at the time when the epoch number is N is not globally stable, the learning continues to achieve the optimization using a network topology different from the network topology at the time when the epoch number is N, as indicated by an arrow 1306.

As described above, according to the present exemplary embodiment, the global stability of the search result can be verified in the process of searching for the architecture of the network.

In the second exemplary embodiment described above, the method of verifying the global stability of the search result after the network topology is changed based on the operation by the user has been described. In a third exemplary embodiment, a method of verifying the global stability of the search result while the network topology is periodically changed by the information processing apparatus 100 will be described. Description of a part common to the second exemplary embodiment will be omitted, and a difference from the second exemplary embodiment will be mainly described. The following description will be given of a case where two holes are assumed to be a standard state of the topological invariant (the number of holes) and a fluctuation of plus or minus 1 is given thereto.

Figure 13:
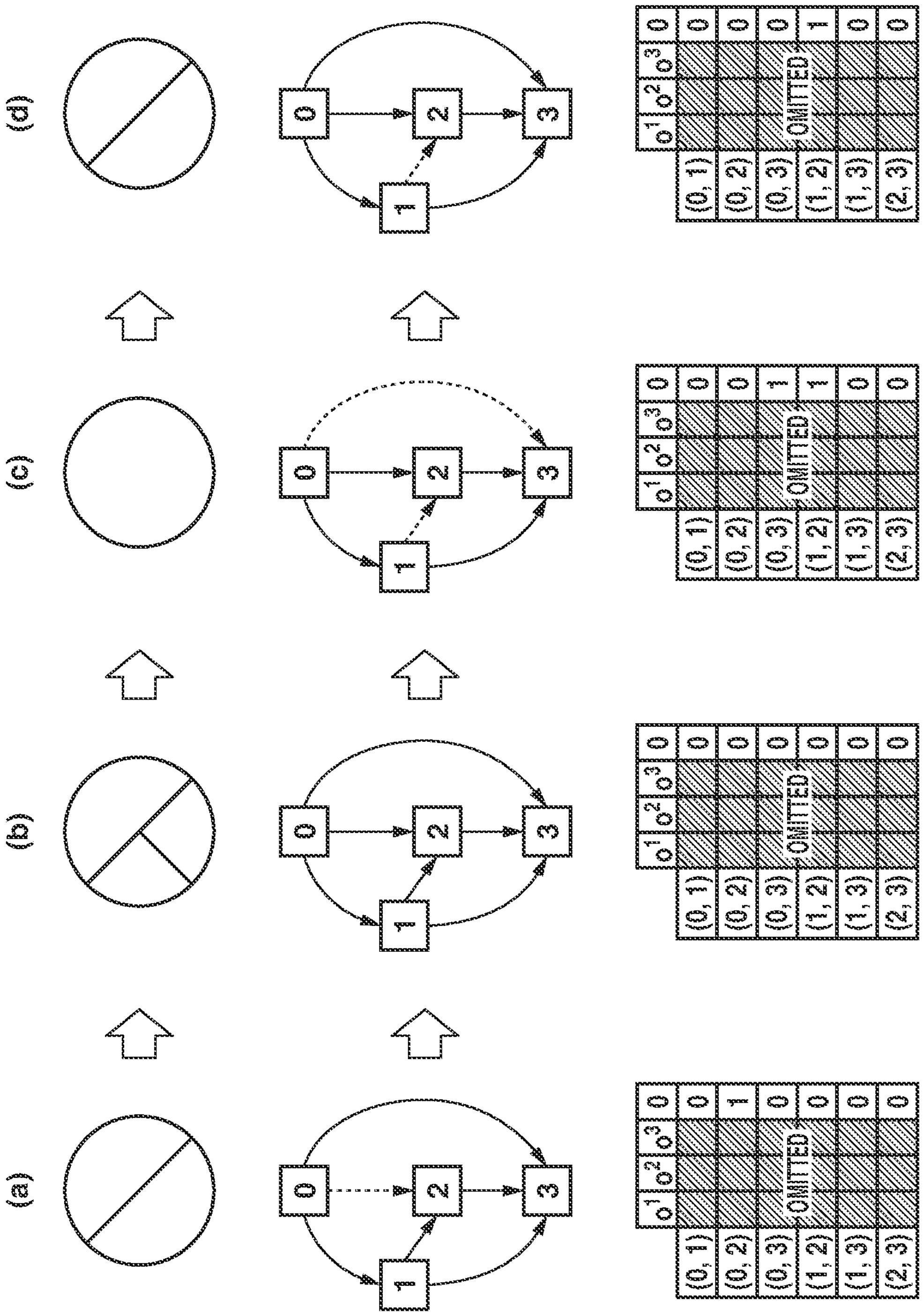
FIG. 13 is a diagram illustrating fluctuations given to the network topology.

FIG. 13 schematically illustrates a state where fluctuations are given to the topological invariant to change the network topology periodically in the NAS-based architecture search process. States (a) to (d) in FIG. 13 indicate the way the topological invariant (the number of holes) changes in order of 2 (which is the standard state), 3, 1, and 2. An upper part of FIG. 13 illustrates examples of the network topology. A middle part of FIG. 13 illustrates examples of the connection state of the network corresponding to the network topology. A lower part of FIG. 13 illustrates examples of the architecture expression matrix corresponding to the connection state of the network. In a case where the connection state of the network corresponding to the topological invariant (the number of holes) is not uniquely determined, the control device 111 can randomly determine one from among a plurality of candidate connection states.

In the present exemplary embodiment, in step S301, the control device 111 changes the network connection state by giving a fluctuation to the topological invariant at present. The search process monitoring unit 307 monitors the val_acc and the topological invariant acquired in the state where the fluctuation is given. A global change in the form of the network can be thereby verified more directly than in giving a fluctuation to a value of the architecture expression matrix. In the present exemplary embodiment, the fluctuation of the topological invariant is reflected in the architecture expression matrix, but the fluctuation can be given to a value itself in the part about the connection state of the network in the architecture expression matrix.

As described above, according to the present exemplary embodiment, the global stability of the search result can be verified in the process of searching for the architecture of the network.

The exemplary embodiments of the present disclosure include a case where the functions according to the above-described exemplary embodiments are implemented by supplying a software program to a system or an apparatus directly or remotely, and causing a computer of the system or the apparatus to read out the supplied program and execute the read-out program. In this case, the supplied program is a computer readable program corresponding to the flowchart illustrated in each of the exemplary embodiments. Further, besides being implemented by the execution of the read-out program by the computer, the functions according to the above-described exemplary embodiments can be implemented in cooperation with an operating system (OS) or the like running on the computer, based on instructions of the program. In this case, the OS or the like performs part or all of actual processing, and the functions according to the above-described exemplary embodiments are implemented by the processing.

According to the exemplary embodiments of the present disclosure, performance evaluation can be appropriately performed in the process of searching for the architecture of the network model.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-065813, filed Apr. 12, 2022, which is hereby incorporated by reference herein in its entirety.

What is claimed is:

1. An information processing apparatus configured to optimize an architecture of a network model, the information processing apparatus comprising:

at least one memory storing instructions; and at least one processor that, upon execution of the instructions, is configured to:

perform a search for the architecture based on data for learning, the data for learning including input data and training data, the input data is input to a target network, the training data is used to calculate an error of an output value obtained as a result of a feedforward calculation, and the error is back-propagated in the network;

evaluate a topological invariant of the network model corresponding to the architecture obtained in a process of the search; and perform control to output a change in an evaluation result of the topological invariant as the search progresses, wherein the search includes searching for an optimum architecture expression that represents a search target network using connection states between a plurality of contact points and calculations between the plurality of contact points.

2. The information processing apparatus according to claim 1, wherein the at least one processor is further configured to evaluate a correct answer rate using evaluation data for the network model that corresponds to the architecture obtained during the search, and wherein the at least one processor is further configured to perform control to output the change in the result of evaluating the topology corresponding to a result of evaluating the correct answer rate with the progress of the search.

3. The information processing apparatus according to claim 1, wherein the at least one processor is further configured to control a display device to display the change in the result of evaluating the topology.

4. The information processing apparatus according to claim 1, wherein the at least one processor is further configured to perform learning of a weight coefficient of the network model along with the search for the architecture.

5. The information processing apparatus according to claim 4, wherein the at least one processor is further configured to determine, based on an amount of the change in the evaluated topology, whether the result has settled on a fixed value, and wherein in a case where it is determined that the result has settled on the fixed value, the at least one processor is further configured to continue the learning of the weight coefficient of the network model after fixing the architecture.

6. The information processing apparatus according to claim 1, wherein the topology of the network model is changed based on an operation by a user, and wherein the at least one processor is further configured to perform control to output the change in the result of evaluating the topology before and after the change of the topology.

7. The information processing apparatus according to claim 1, wherein the at least one processor is further configured to perform control to periodically change the topology of the network model, and wherein the at least one processor is further configured to perform control to output the change in the result of evaluating the topology in a state where the topology of the network model is periodically changed.

8. The information processing apparatus according to claim 1, wherein the at least one processor is further configured to store a correspondence relationship between a connection state of the network model and the topological invariant, and wherein using the correspondence relationship, the at least one processor is further configured to acquire the topological invariant based on the connection state of the network model that corresponds to the architecture obtained in the process of the search.

9. The information processing apparatus according to claim 1, wherein the topological invariant is at least one of a number of holes, a number of connected components, or a number of hollow areas.

10. The information processing apparatus according to claim 1, wherein the architecture of the network model is optimized using a technique of Neural Architecture Search (NAS).

11. An information processing method for optimizing an architecture of a network model, the information processing method comprising:

performing a search for the architecture based on data for learning, the data for learning including input data and training data, the input data is input to a target network, the training data is used to calculate an error of an output value obtained as a result of a feedforward calculation, and the error is back-propagated in the network;

evaluating a topological invariant of the network model corresponding to the architecture obtained in a process of the search; and performing control to output a change in an evaluation result of the topological invariant as the search progresses, wherein the search includes searching for an optimum architecture expression is such that represents a search target network using by connection states between a plurality of contact points and calculations between the plurality of contact points.

12. A non-transitory computer-readable storage medium storing computer-executable instructions that configure one or more processors to perform an information processing method for optimizing an architecture of a network model, the information processing method comprising:

performing a search for the architecture based on data for learning, the data for learning including input data and training data, the input data is input to a target network, the training data is used to calculate an error of an output value obtained as a result of a feedforward calculation, and the error is back-propagated in the network;

evaluating a topological invariant of the network model corresponding to the architecture obtained in a process of the search; and performing control to output a change in an evaluation result of the topological invariant as the search progresses, wherein the search includes searching for an optimum architecture expression that represents a search target network using by connection states between a plurality of contact points and calculations between the plurality of contact points.

* * * * *